United States Patent [19]

Ewers

[11] Patent Number: 4,756,300
[45] Date of Patent: Jul. 12, 1988

[54] SOLAR WATER HEATER, METHOD OF CONSTRUCTION AND STOCK WATER HEATING SYSTEM

[76] Inventor: Marion H. Ewers, 306 S. Broadway, Marlow, Okla. 73055

[21] Appl. No.: 395,843

[22] Filed: Jul. 6, 1982

Related U.S. Application Data

[63] Continuation-in-part of Ser. No. 122,949, Feb. 20, 1980.

[51] Int. Cl.⁴ .................................................. F24J 3/02
[52] U.S. Cl. .................................... 126/415; 126/443; 126/442; 126/450; 126/448; 126/437; 220/76
[58] Field of Search ............... 126/415, 367, 900, 442, 126/443, 450, 219, 448, 437; 4/493, DIG. 1; 220/75, 76

[56] References Cited

U.S. PATENT DOCUMENTS

| | | | |
|---|---|---|---|
| 404,572 | 6/1889 | Spiro | 126/367 |
| 1,502,008 | 7/1924 | Bagley | 126/367 |
| 1,825,596 | 9/1931 | Krongoest | 220/76 X |
| 1,842,783 | 1/1932 | Hauser | 220/76 X |
| 1,849,266 | 5/1932 | Bentz | 126/434 X |
| 2,064,345 | 12/1936 | Hodgson | 126/434 |
| 2,402,326 | 7/1946 | Harkness | 126/437 X |
| 4,086,911 | 5/1978 | Futch | 126/443 X |
| 4,108,156 | 8/1978 | Sitter | 126/415 |
| 4,149,525 | 4/1979 | Prado | 126/443 X |
| 4,172,441 | 10/1979 | Newton | 126/442 |
| 4,184,481 | 1/1980 | Tornquist | 126/447 X |
| 4,235,221 | 11/1980 | Murphy | 126/415 |
| 4,276,122 | 6/1981 | Snyder | 126/440 X |
| 4,360,004 | 11/1982 | Testolini | 126/415 |

FOREIGN PATENT DOCUMENTS 820705 11/1937 France ............................... 126/415

*Primary Examiner*—Samuel Scott
*Assistant Examiner*—Carl D. Price
*Attorney, Agent, or Firm*—Charles E. Cates

[57] ABSTRACT

A solar water heater apparatus particularly useful for stock tanks in remote locations has an open water tank, a heater floated in the tank with a portion of the heater below the water, and means for maintaining the heater location in the tank. The solar heater may have a frusto-conical support made of curved trapezoidal surfaces, coils around the support member adapted to carry antifreeze and a number of the coils disposed below water.

9 Claims, 2 Drawing Sheets

U.S. Patent    Jul. 12, 1988    Sheet 1 of 2    4,756,300
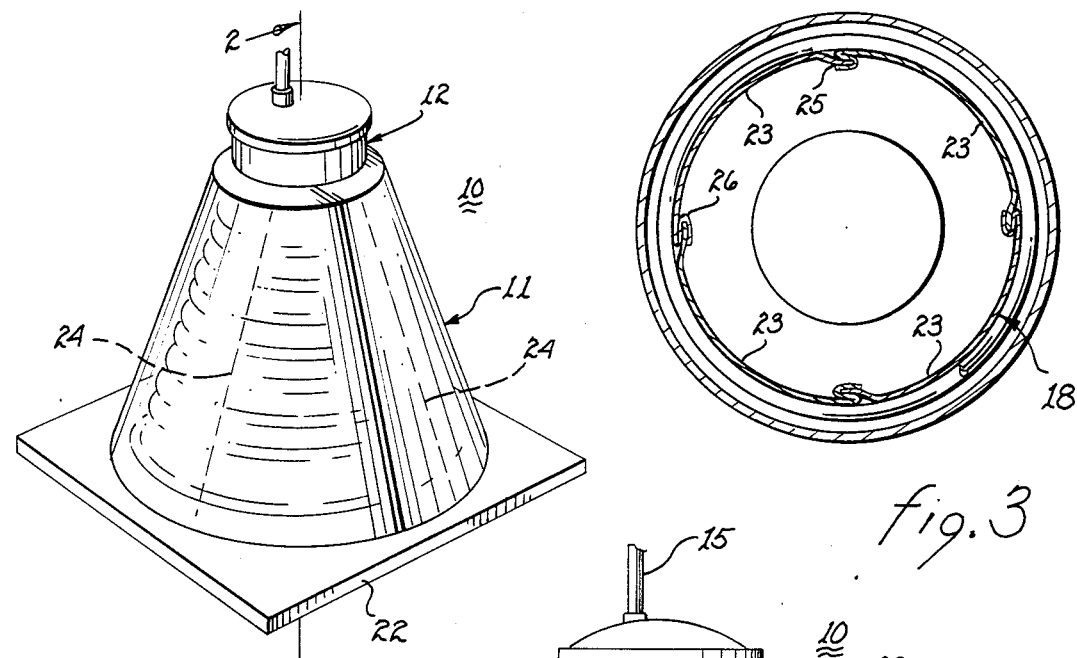
fig.3
fig.1
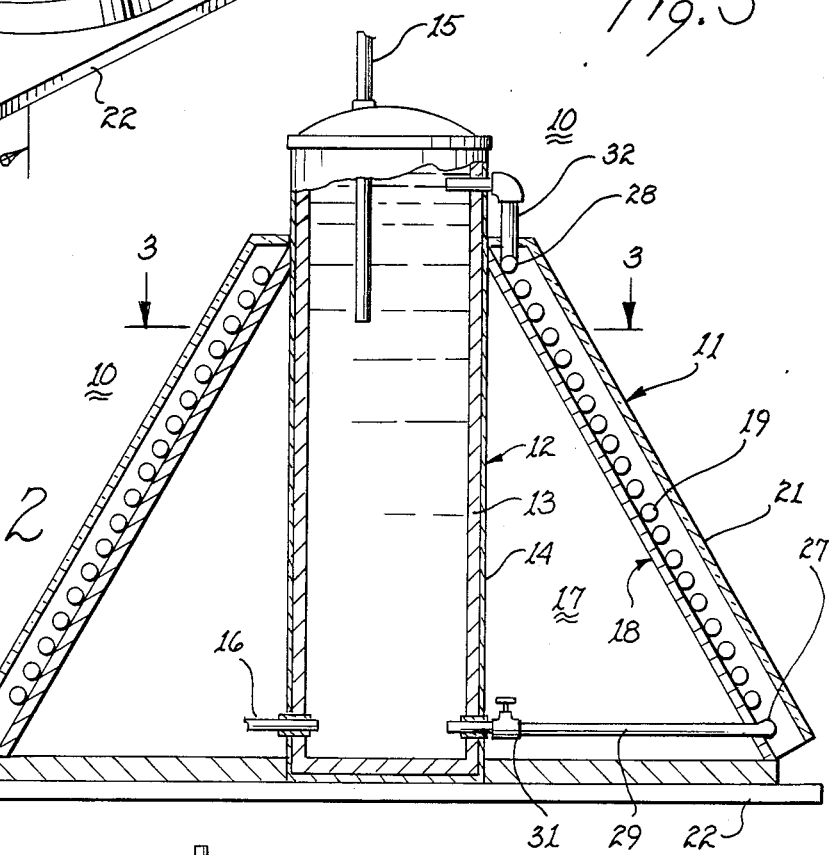
fig.2
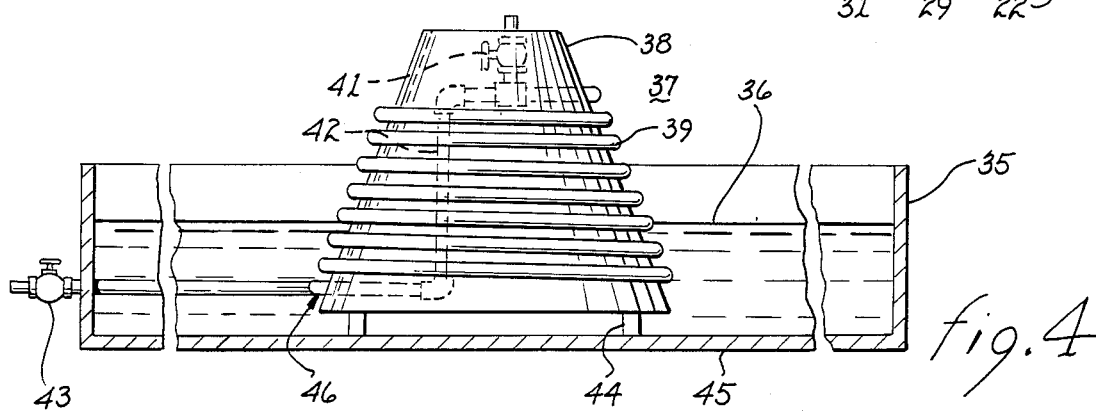
fig.4

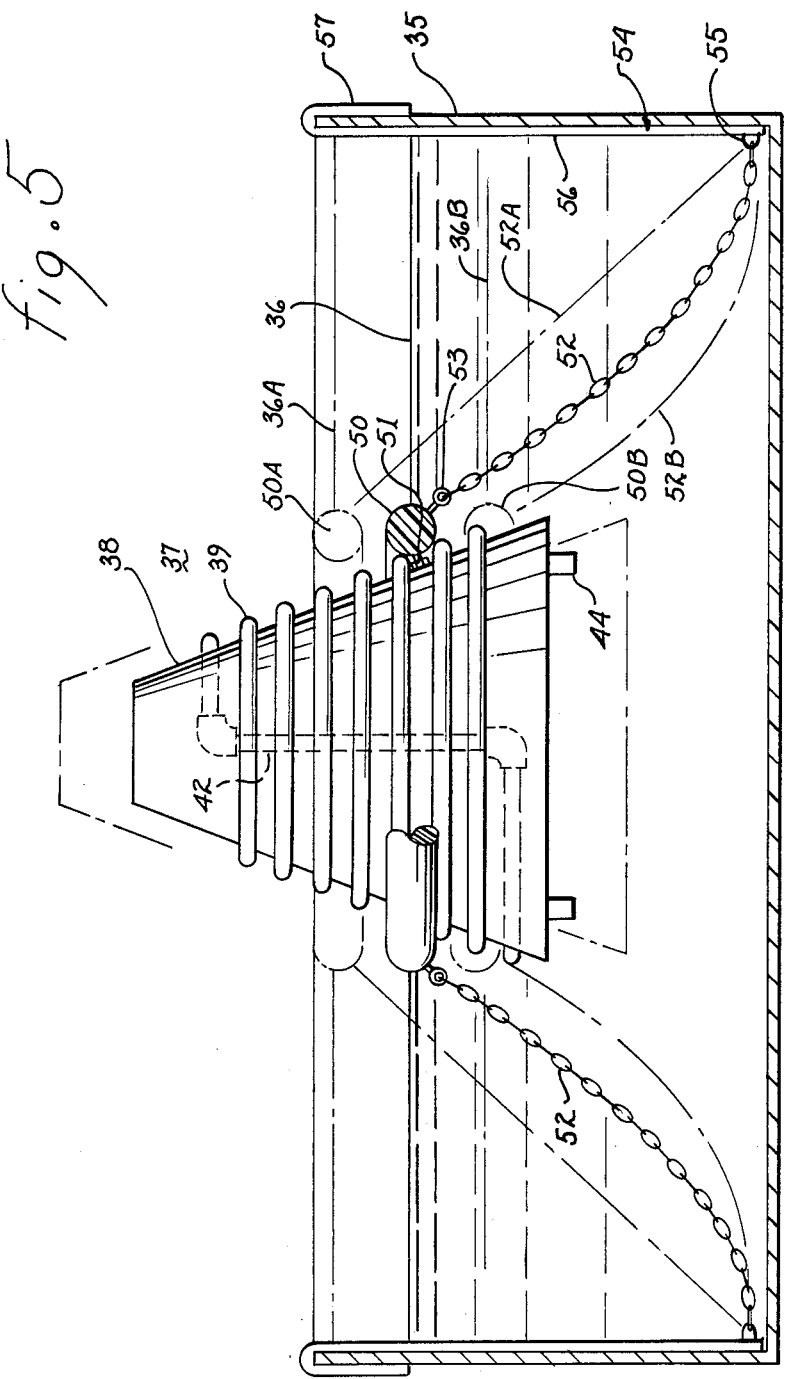

SOLAR WATER HEATER, METHOD OF CONSTRUCTION AND STOCK WATER HEATING SYSTEM

This is a continuation-in-part of application Ser. No. 06/122,949, filed Feb. 20, 1980, now abandoned.

BACKGROUND OF THE INVENTION

This invention relates to a solar water heating apparatus and a method of construction thereof, with particular reference to a stock water heating system, and it is an object of the invention to provide an improved apparatus, method and system of this nature.

Improvements are needed to open water stock tanks in areas subject to freezing, particularly to stock watering tanks in remote places. In such places attending personnel frequently have to haul in the water to be placed in the stock watering tank, and between visits the water level may vary from relatively high to substantially lower value. Under all of these conditions the solar water heater has to operate in such a way that the water is thawed for the stock's use whether the water level is high or low. In addition, the solar heating unit has to be disposed away from the edges of the tank at all times so as not to interfere with the stock's drinking from the tank.

It is, therefore, highly desirable to have a solar water heater that is simple and inexpensive to make, is at the same time sufficiently strong for the intended purpose, and is efficient in operation.

Further objects and advantages of the present invention will become apparent as the description proceeds.

SUMMARY OF THE INVENTION

In carrying out the invention in one form there is provided a solar water heater comprising a frusto-conical supporting member, the supporting member including a series of curved trapezoidal surfaces having interfitting edges along their slant length juncture, a continuous convolution of flexible coils wrapped around the frusto-conical support surface and resting thereon, the coils being adapted to contain a liquid to be heated and being wrapped under tension for holding the series of curved trapezoidal surfaces in assembled edge-interfitting relationship, with the weight of the coils assisting in holding the curved trapezoidal surfaces in place. The coils may be black plastic tubing for more effective heating.

A solar heating system for melting ice in a stock watering tank has an open water tank of predetermined size adapted to have water therein at a certain level. A solar water heater, substantially less in cross section than the predetermined size is disposed in the tank in a substantial area of surrounding water. The water heater is made with a frusto-conical supporting member including a series of curved trapezoidal surfaces having interfitting edges along their slant length juncture, a continuous convolution of coils wrapped around the curved trapezoidal surfaces and holding them in assembled, edge-interfitting relationship with the weight of the coils. The coils are adapted to contain an anti-freeze liquid to be heated and have a desired predetermined number of the convolutions disposed below the surface of the water in the water tank.

BRIEF DESCRIPTION OF THE DRAWINGS

FIG. 1 is a perspective view of a solar water heater according to the invention;

FIG. 2 is a sectional view, on an enlarged scale, taken substantially in the direction of the arrows 2—2 of FIG. 1;

FIG. 3 is a sectional view, taken substantially in the direction of the arrows 3—3 of FIG. 2;

FIG. 4 is a sectional view of a modified form of the invention; and

FIG. 5 is a sectional view similar to FIG. 4 of a stock watering tank system according to the invention.

DESCRIPTION OF THE PREFERRED EMBODIMENTS

The drawings (see FIGS. 1-3) show a solar water heater 10 having a solar heating unit 11 and a centrally disposed water tank 12. The water tank 12 is a metallic cylindrical tank 13 surrounded by a layer of insulation 14, or the like, a hot water outlet 15 and a cold water inlet 16 being provided as shown. The space 17 between the exterior of the tank 12 and the interior of the heat exchange solar heating unit 11 may be fulled either with air, fibrous insulation, etc., as may be desired.

The solar heating unit 11 is a frusto-conical supporting structure 18, a continuous convolution of coils 19 on the structure, and, if desired, an exterior frusto-conical covering 21 which may be of glass or other heat transmitting material.

The upper, or truncated, end of the frusto-conical supporting member 18 may be attached, if desired, to the water tank 13 and the lower end of the frusto-conical supporting member 18 may be adapted to be disposed on the ground or any other foundation structure 22.

The frusto-conical supporting structure 18 may comprise a series of curved trapezoidal elements 23 (FIG. 3), four being utilized in the present arrangement, although other numbers of them may be used. The curved trapezoidal elements 23 are small at their tops and large at their bottoms. See the dotted lines 24 (FIG. 1) representing the seams or edges of the curved trapezoidal elements 23 where they join.

Each of the curved trapezoidal elements 23 includes an ordinary straight edge 25 and a re-entrant edge 26. The re-entrant edge 26 is formed by doubling a portion of the edge of element 23 back upon itself and then re-folding it forward (as may be seen in FIG. 3) to form a receptacle for an ordinary straight edge of a second element 23. Thus, the ordinary edge 25 of one curved trapezoidal element 23 interfits with the re-entrant edge 26 of an adjacent curved trapezoidal element 23. The re-entrant edge 26 is formed to easily receive the ordinary edge 25 so that adjacent elements 23 may be fitted together to form the frusto-conical supporting structure 18.

Wrapped around the frusto-conical supporting structure 18 are the coils 19, beginning with the coil 27 at the lower end of the structure and terminating with the coil 28 at the upper end thereof. The convolution of coils 19 may be formed of any suitable material such as black plastic tubing, preferably polyethylene tubing.

The convolutions are wrapped with a slight tension around the supporting structure 18 to hold the various pieces 23 of the supporting structure together. No further need for riveting, bolting, soldering or any other form of attachment is necessary for holding the elements 23 together so long as these elements interfit with each other as described.

The angle of the frusto-conical structure 18 may be chosen to be most effective with respect to the average angle of the sun during its pathway across the sky.

The lower coil 27 communicates through pipe 29 and valve 31 with the interior of tank 13 at the lower end thereof and the upper coil 28 communicates through pipe 32 with the interior of tank 13 at the upper end thereof.

As the sun's rays fall on the coils of convolution 19, the water therein is heated and rises, thus heating the water in the upper end of tank 13. The cooler water in the bottom of tank 13 then flows into the lower coils of convolution 19 and in turn is heated. This circulation process continues until the water in tank 13 is all heated. When hot water is withdrawn through pipe 15, cold water flows in through pipe 16 and, if the sun is shining, the heating process continues.

The form shown in FIG. 4 is particularly useful for a water tank 35 in an open field. The tank 35 may be of any configuration adapted to contain water at a desired level as shown, for example, by reference character 36. The solar heating unit 37 is disposed centrally of the tank for melting the ice which may have been frozen in sub-zero temperatures. The solar heater 37 has a central frusto-conical supporting structure 38 constructed in accordance with the description of the frusto-conical member 18 of the preceeding figures. Surrounding the frusto-conical member 38 is a series of convolutions of black polyethylene pipe 39. The coils of the pipe 39 are wound around the surface of supporting structure 38 with a slight tension to hold the portions of the supporting surface 38 together as described.

The convolutions 39 may be filled with an anti-freeze liquid supplied through a valve 41. A drain valve 43 is disposed at the lower convolution.

The pipe 42 and the valve 41 are disposed interiorly of the supporting structure 38 away from the sun. Thus, the liquid in pipe 42 remains cooler than the liquid in the convolutions 39 exposed to the sun. Thermo-siphoning then takes place by virtue of liquid, being heated, rising in the coils and being replaced by cooler liquid from the bottom of pipe 42.

The sun's rays falling on the convolutions 39 of the coils heats the liquid anti-freeze, causing it to rise in the convolutions, thus circulating the heated liquid from the top convolution through conduit 42 to the bottom convolution in a thermal movement or siphon effect. Because the liquid in the coils 39 is heated and the lowermost three or four of the convolutions 46, for example, are disposed beneath the surface 36 of the water, ice formed from the freezing water is melted. Accordingly, it is continually available for the cattle to drink.

FIG. 5 shows a stock watering tank system similar to FIG. 4, but which enables the apparatus to be more conveniently used in remote locations. In FIG. 5 the same reference characters are used as in FIG. 4 and the other figures for the same or corresponding parts. For these reasons the description of the common structure shown in FIG. 5 will not be repeated.

A flotation collar 50 attached to the frusto-conical member 38 by brackets 51 maintains the solar heating unit 37 in the position shown in FIG. 5. Attached equidistantly around the circumference of the flotation collar 50 are a series of link chains 52, links 53 being provided for this purpose at one end of each of the link chains 52. The other, or lower, ends of each of the link chains 52 are attached to the lower ends of brackets 54, hooks or the like 55 being provided for this purpose.

The brackets 54 may be elongated rod members having one leg 56 about the same length as the depth of tank 35 and having a second leg 57 at the upper end bent downwardly along the leg 56. The legs 56 and 57 clamp the sides of the tank 35 between them when the bracket 54 is placed with its lower end at the bottom of the tank. In this manner, all of the link chains 52 around the periphery of the flotation collar 50 may be attached to the sides of the tank 35 to keep the solar heating unit 37 in the center of the tank. Even though cattle may nudge the solar unit and chunks of ice floating in the water may contact it, the solar unit will stay approximately centered in the tank.

The water level 36 as shown in FIG. 5 is representative of a normal water level. When additional water is added to the tank the level rises to the value shown by line 36A, the flotation collar 50 assumes a position shown by the reference character 50A and the link chains 52 assume a straighter line position, such as 52A. The solar unit 37 remains essentially centered in the tank.

The flotation collar 50 is attached to the frusto-conical structure 38 so that the number of convolutions of the coil 39 needed to heat the water are retained under the surface 36. The upper and lower coils or turns of the convoluted pipe 39 may be connected as shown in FIG. 5 without a valve or, if desired, a valve may be placed in the pipes as shown in FIG. 4.

The flotation collar 50 may be made of any suitable material having the desired flotation characteristics both as to material and size. Styrofoam has been found to be one material that works satisfactorily under a variety of conditions.

The brackets 54 are removeable by sliding them out against the spring resistance of the legs 56 and 57, so the unit is easily transportable and assembled for use at a new location. The feet 44 may be retained for the heating unit to sit on if the water is consumed to the near empty point.

The supporting structure 38 carrying the convolutions 39 may be supported by legs 44 on the bottom 45 of the tank 35.

It will be understood that alternative forms of the invention may be conceived within the spirit and scope of the subject disclosure.

What is claimed is:

1. A solar water heating system for a tank subject to freezing comprising an open water tank of predetermined size adapted to have water therein at a certain level, a solar water heater substantially less in cross section than said predetermined size disposed in said tank and adapted to have a substantial area of surrounding water in said tank, said water heater comprising a frusto-conical supporting member including a series of curved trapezoidal surfaces having interfitting edges along their slant length juncture, continuous convolutions of coils wrapped around said curved trapezoidal surfaces and resting thereon for holding said series of curved trapezoidal surfaces in assembled edge interfitting relationship with the weight of said coils, said coils being adapted to contain an anti-freeze liquid to be heated, and a predetermined number of said convolutions being disposed below the surface of the water in said water tank.

2. The solar water heating system according to claim 1 wherein the convolution at the upper end of said frusto-conical supporting member is connected interiorly of the supporting member to the convolution at the lower end of said frusto-conical member.

3. The solar water heating system according to claim 2 wherein there are provided a filling receptacle at said upper convolution and a drain receptacle at said lower convolution.

4. The solar water heater according to claim 1 wherein said interfitting edges include a re-entrant portion along one edge of one curved trapezoidal surface and a straight portion along the other edge thereof.

5. The solar water heater according to claim 1 wherein said coils comprise black plastic tubing.

6. A stock water heating system for a tank subject to freezing comprising an open water tank of predetermined size adapted to have water therein at a varying level, a solar water heater substantially less in cross section than said predetermined size disposed in said tank at a location therein and adapted to have a substantial area of surrounding water in said tank, means for floating said solar water heater on the surface of the water in said tank with a predetermined portion of said solar water heater being disposed below the surface of the water in said tank, and means for maintaining said solar water heater at said location in said tank irrespective of the water level therein.

7. The stock water heating system according to claim 6 wherein said location maintaining means comprises a series of chains each having one end attached at spaced points around said solar water heater and each having another end attached at spaced points around the perimeter of said tank, the lengths of said chains having values to permit rise and fall of said solar water heater with the rise and fall of the water level in said tank.

8. The stock water heating system according to claim 7, wherein the attachment around the perimeter of the tank comprises a series of brackets attached at one end, respectively, to one end of said chains and engageable with the sides of said tank.

9. The stock water heating system according to claim 8 wherein each of said brackets comprises a "u" shaped member, one leg of said "u" having the other end of the respective chain attached and disposable near the bottom of said tank, the legs of said "u" forming a clamping relationship with the walls of said tank.

* * * * *